United States Patent [19]
Suematsu et al.

[11] Patent Number: 6,111,872
[45] Date of Patent: Aug. 29, 2000

[54] TELEMETER TELECONTROL SYSTEM

[75] Inventors: Takayuki Suematsu, Yamatokoriyama; Hiroyuki Imai, Takaraduka; Kazuhiro Ando, Katano; Shinichiro Ohmi, Toyono, all of Japan

[73] Assignee: Matsushita Electric Industrial Co., Ltd., Osaka-fu, Japan

[21] Appl. No.: 08/608,548

[22] Filed: Feb. 28, 1996

[30] Foreign Application Priority Data

Mar. 3, 1995 [JP] Japan .................................... 7-043986

[51] Int. Cl.$^7$ ...................................................... H04Q 9/00
[52] U.S. Cl. ................ 370/350; 340/870.14; 340/825.14
[58] Field of Search ................................... 370/350, 515, 370/448, 503, 507; 340/825.06, 825.03, 825.14, 870.03, 506, 539, 10.2, 870.07

[56] References Cited

U.S. PATENT DOCUMENTS

| | | | |
|---|---|---|---|
| 4,734,680 | 3/1988 | Gehman et al. | 340/539 |
| 4,799,059 | 1/1989 | Grindhal et al. | 340/870.03 |
| 4,855,713 | 8/1989 | Brunius | 340/506 |
| 5,053,883 | 10/1991 | Johnson | 340/825.08 X |
| 5,446,453 | 8/1995 | Nagamoto et al. | 340/825.06 |

FOREIGN PATENT DOCUMENTS 2-238797  9/1990  Japan .
5-292564  11/1993  Japan .

*Primary Examiner*—Edwin C. Holloway, III
*Attorney, Agent, or Firm*—Wenderoth, Lind & Ponack, L.L.P.

[57] ABSTRACT

A master station performing continuous operations is communicatively coupled with a plurality of remote stations performing intermittent transmission/receiving operations in constant cycles. Control units of the remote stations control radio communication devices to transmit synchronizing signals to the master station in constant cycles respectively. When the synchronizing signals are received from the remote stations, a control unit of the master station acquires information of corresponding intermittent receiving timing from a memory device, and controls a radio communication device to perform transmitting operations to the remote stations in coincidence with the intermittent receiving timing. Further, the control unit of the master station reads random number values from a random number generator in re-transmission of data, and shifts data transmission timing from original timing by time corresponding to the random number values. On the other hand, the control units of the remote stations read random number values from random number generators in re-receiving of the data, and shift data receiving timing from original timing by time corresponding to the random number values. Thus, the data collision probability is reduced.

9 Claims, 9 Drawing Sheets

TELEMETER TELECONTROL SYSTEM

BACKGROUND OF THE INVENTION

1. Field of the Invention

The present invention relates to a telemeter telecontrol system, and more particularly, it relates to a telemeter telecontrol system having a master station which collects measured values from remote stations while remotely controlling operations thereof.

2. Description of the Background Art

In recent years, a telemeter telecontrol system comprising a master station and a remote station is utilized in a factory, a warehouse or the like, in order to automatically measure and remotely control meters such as gas meters and electric meters. An example of such a conventional telemeter telecontrol system is now described with reference to the drawings.

FIG. 10 is a block diagram showing the structure of a conventional telemeter telecontrol system. Referring to FIG. 10, this telemeter telecontrol system comprises a single master station 81 and a single remote station 82.

The master station 81 transmits a synchronizing signal to the remote station 82 in a constant cycle. The remote station 82, which continuously performs a receiving operation, transmits an acknowledgement signal to the master station 81 when the synchronizing signal is received from the master station 81. When the acknowledgement signal is received from the remote station 82, the master station 81 transmits data to the remote station 82.

In the aforementioned structure, however, a plurality of master stations are disadvantageously required when connection and control of a plurality of remote stations are necessary. Further, the remote station 82 disadvantageously requires high power consumption, due to the continuous receiving operation. Particularly when the remote station is battery-operated, the batteries are so quickly consumed that they must be exchanged in a short period.

Japanese Patent Laying-Open No. 5-292564 (corresponding to U.S. Pat. No. 5,446,453) discloses a transmission/receiving system for intermittently waiting for signals thereby reducing power consumption for the signal wait and increasing the battery lives. However, this transmission/receiving system is also structured to transmit data from a single transmitter to a single receiver similarly to the system shown in FIG. 10, and aimed at no transmission/receiving between a single master station and a plurality of remote stations, dissimilarly to the present invention.

SUMMARY OF THE INVENTION

Accordingly, an object of the present invention is to provide a telemeter telecontrol system which can control a plurality of remote stations through a single master station, with small power consumption of the respective remote stations.

In order to achieve the aforementioned object, the present invention has the following characteristics:

A first aspect of the present invention is directed to a system having a single master station collecting measured values from a plurality of remote stations while remotely controlling operations thereof, each remote station is adapted to perform intermittent transmission/receiving operations in a constant cycle, and comprises:

a remote station side communication device, and
a remote station side control unit controlling the remote station side communication device for transmitting a synchronizing signal to the master station in a constant cycle, and the master station comprises:

a master station side communication device,
a memory device storing intermittent receiving timing information of each remote station, and
a master station side control unit controlling the master station side communication device for acquiring information on an intermittent receiving timing for the corresponding remote station from the memory device upon receiving the synchronization signal from each remote station and performing a transmitting operation for the remote station in coincidence with the intermittent receiving timing.

According to the first aspect, as hereinabove described, each remote station performs intermittent transmission/receiving operations in a constant cycle, and transmits a synchronizing signal to the master station in the constant cycle. On the other hand, the master station acquires information on the intermittent receiving timing for the corresponding remote station from the memory device when the same receives the synchronizing signal from each remote station, and performs a transmitting operation for the remote station in coincidence with the intermittent receiving timing. Consequently, a plurality of remote stations can be controlled through a single master station. Further, each remote station, which performs intermittent transmission/receiving operations, has small power consumption, and is suitable for battery operations.

In a preferred embodiment according to the aforementioned first aspect, the master station further comprises a master station side random number generator generating a random number series which is specific to each remote station, while each remote station further comprises a remote station side random number generator generating the same random number series as the corresponding random number series of the master station side random number generator, and this random number series is different from those of the other remote stations. The master station side control unit of the master station controls the master station side communication device for reading a random number value "a" corresponding to prescribed time t1 from the master station side random number generator in transmission of data at the time t1 and shifting data transmission timing from the prescribed time t1 by time corresponding to the random number value "a". The remote station side control unit of each remote station controls the remote station side communication device for reading the random number a corresponding to the prescribed time t1 from the remote station side random number generator in receiving of the data at the time t1 for shifting data receiving timing from the prescribed time t1 by the time corresponding to the random number value "a". Thus, the data collision probability can be remarkably reduced by shifting the data transmission/receiving timing from original timing by the random numbers between the master station and the remote stations while varying the random number values with the remote stations.

The remote station side and master station side random number generators may be so formed that random number generation is reset in synchronization with the cycle of the synchronizing signals. Thus, even if the random number values are shifted between the master station and the remote stations for some reason or other, such shift can be readily recovered.

A second aspect of the present invention is directed to a system having a single master station collecting measured values from a plurality of remote stations while remotely controlling operations thereof, the master station comprises:
a master station side communication device,
a memory device storing intermittent receiving timing information of each remote station, and
a master station side control unit controlling the master station side communication device for transmitting a synchronizing signal to each remote station in a constant cycle and acquiring information of intermittent receiving timing for the corresponding remote station from the memory device in transmission of data to each remote station for performing a transmitting operation for each remote station in coincidence with the intermittent receiving timing, and
each remote station is adapted to perform intermittent transmission/receiving operations in a constant cycle, and comprises:
a remote station side communication device, and
a remote station side control unit controlling the remote station side communication device for performing an intermittent receiving operation in synchronization with the synchronizing signal which is transmitted from the master station.

According to the second aspect, as hereinabove described, the master station transmits a synchronizing signal to each remote station in the constant cycle. In transmission of data to each remote station, the master station acquires information of the intermittent receiving timing for the corresponding remote station from the memory device, and performs a transmitting operation for the remote station in coincidence with the intermittent receiving timing. Each remote station performs an intermittent receiving operation in synchronization with the synchronizing signal which is transmitted from the master station. Consequently, a plurality of remote stations can be controlled through a single master station. Further, each remote station, which performs intermittent transmission/receiving operations, has small power consumption, and is suitable for battery operations.

In a preferred embodiment according to the aforementioned second aspect, the master station further comprises a master station side random number generator generating a random number series which is specific to each remote station, while each remote station further comprises a remote station side random number generator generating the same random number series as the corresponding random number series of the master station side random number generator, and this random number series is different from those of the other remote stations. The master station side control unit of the master station controls the master station side communication device for reading a random number value a corresponding to a prescribed time t1 from the master station side random number generator in transmission of data at the time t1 and shifting data transmission timing from the prescribed time t1 by a time corresponding to the random number value "a", and the remote station side control unit of each remote station controls the remote station side communication device for reading the random number "a" corresponding to the prescribed time t1 from the remote station side random number generator in receiving of the data at the time t1 for shifting data receiving timing from the prescribed time t1 by the time corresponding to the random number value "a". Thus, the data collision probability can be remarkably reduced by shifting the data transmission/receiving timing from original timing by the random numbers between the master station and the remote stations while varying the random number values with the remote stations.

A third aspect of the present invention is directed to a system having a single master station collecting measured values from a plurality of remote stations while remotely controlling operations thereof, the master station comprises:
a master station side communication device,
a memory device storing intermittent receiving timing information of each remote station, and
a master station side control unit controlling the master station side communication device for simultaneously transmitting synchronizing signals to all remote stations in a constant cycle and acquiring information of intermittent receiving timing for the corresponding remote stations from the memory device in transmission of data to the remote stations for performing transmitting operations for the remote stations in coincidence with the intermittent receiving timing, and
each remote station is adapted to perform intermittent transmission/receiving operations in a constant cycle, and comprises:
a remote station side communication device, and
a remote station side control unit controlling the remote station side communication device for performing an intermittent receiving operation in synchronization with the synchronizing signal which is transmitted from the master station.

According to the third aspect, as hereinabove described, the master station simultaneously transmits synchronizing signals to all remote stations in the constant cycle. In transmission of data to each remote station, the master station acquires information of the intermittent receiving timing for the corresponding remote station from the memory device, and performs a transmitting operation for the remote station in coincidence with the intermittent receiving timing. Consequently, a plurality of remote stations can be controlled through a single master station. Further, each remote station, which performs intermittent transmission/receiving operations, has small power consumption, and is suitable for battery operations.

In a preferred embodiment according to the aforementioned third aspect, the master station further comprises a master station side random number generator generating a random number series which is specific to each remote station, while each remote station further comprises a remote station side random number generator generating the same random number series as the corresponding random number series of the master station side random number generator, and the random number series is different from those of the other remote stations. The master station side control unit of the master station controls the master station side communication device for reading a random number value "a" corresponding to a prescribed time t1 from the master station side random number generator in transmission of data at the time t1 and shifting data transmission timing from the prescribed time t1 by a time corresponding to the random number value "a". Further, the remote station side control unit of each remote station controls the remote station side communication device for reading the random number "a" corresponding to the prescribed time t1 from the remote station side random number generator in receiving of the data at the time t1 for shifting data receiving timing from the prescribed time t1 by the time corresponding to the random number value "a". Thus, the data collision probability can be remarkably reduced by shifting the data transmission/receiving timing from original timing by the random numbers between the master station and the remote stations while varying the random number values with the remote stations.

The master station side and remote station side random number generators may be so formed that random number generation is reset in synchronization with the cycle of the synchronizing signals. Thus, even if the random number values are shifted between the master station and the remote stations for some reason or other, such shift can be readily recovered.

In another preferred embodiment according to the aforementioned third aspect, the remote stations transmit acknowledgement signals for the synchronization signals from the master station in prescribed order.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
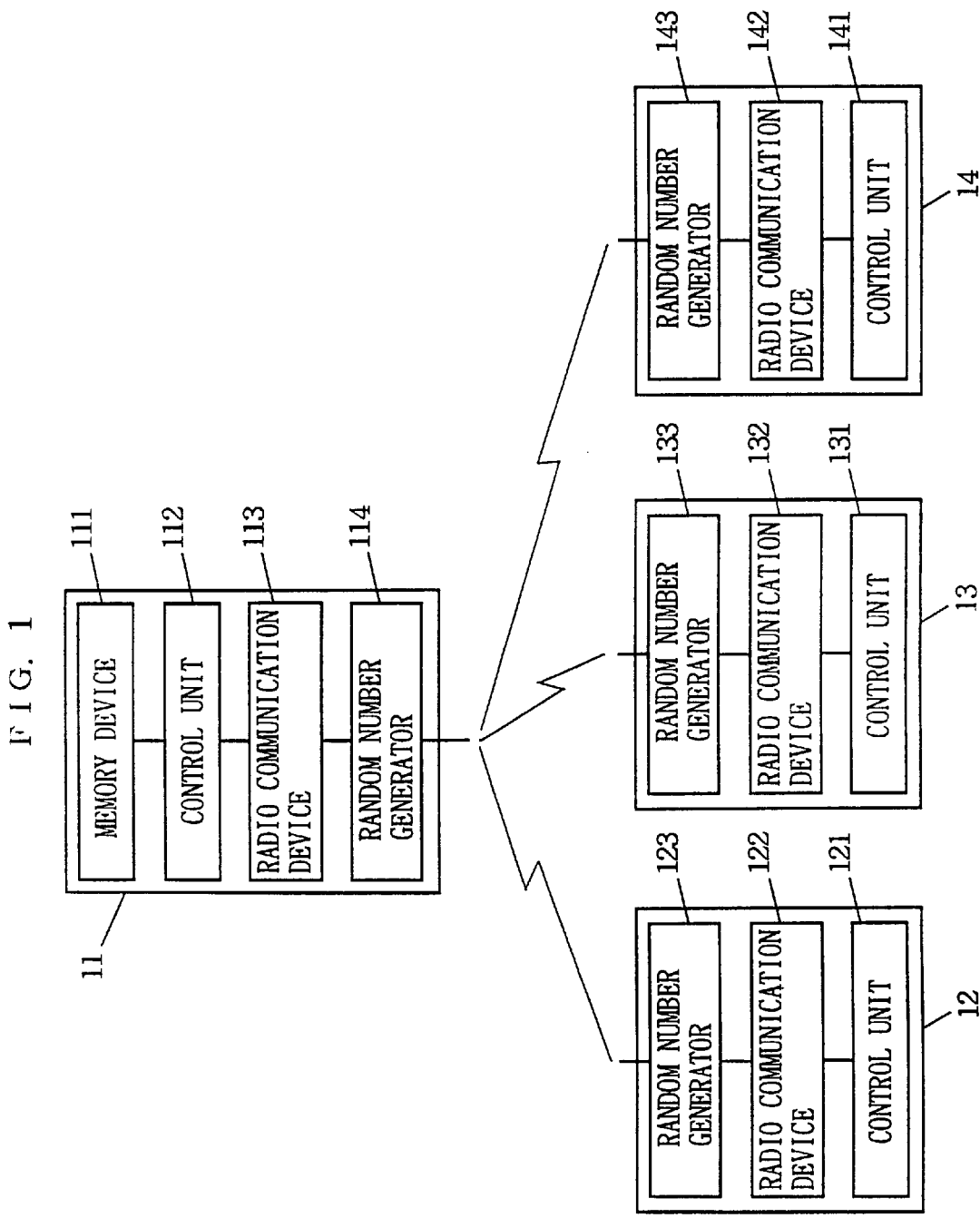
FIG. 1 is a block diagram showing the structure of a telemeter telecontrol system according to a first embodiment of the present invention.

FIG. 1 is a block diagram showing the structure of a telemeter telecontrol system according to a first embodiment of the present invention. Referring to FIG. 1, this telemeter telecontrol system comprises a master station 11 performing continuous receiving, and remote stations 12 to 14 each performing intermittent receiving in a cycle t. The master station 11 includes a memory device 111 for storing transmission timing of synchronizing signals transmitted from a plurality of remote stations, a control unit 112 for controlling intermittent receiving timing of the respective remote stations, a radio communication device 113, and a random number generator 114. The remote station 12 includes a control unit 121, a radio communication device 122, and a random number generator 123. Similarly, the remote station 13 includes a control unit 131, a radio communication device 132, and a random number generator 133, and the remote station 14 includes a control unit 141, a radio communication device 142, and a random number generator 143.

Figure 2:
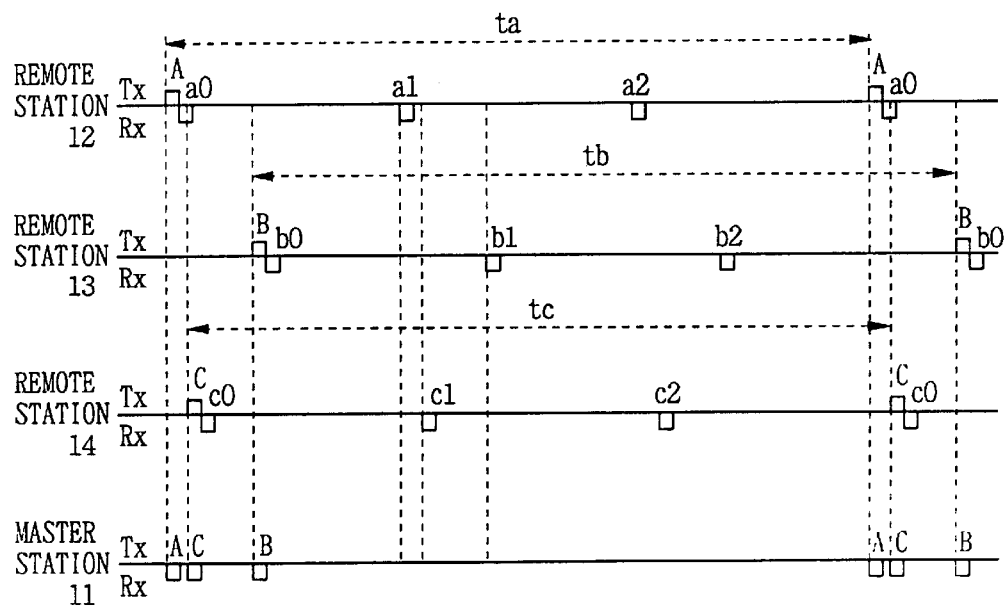
FIG. 2 is a timing chart showing transmission/receiving timing in the case of considering no random number values in the telemeter telecontrol system shown in FIG. 1.

FIG. 2 is a timing chart showing transmission/receiving timing in the case of considering no random number values in the telemeter telecontrol system shown in FIG. 1. Referring to FIG. 2, symbol ta denotes a synchronizing signal transmission cycle of the remote station 12 with respect to the master station 11. Symbol tb denotes a synchronizing signal transmission cycle of the remote station 13 with respect to the master station 11. Symbol tc denotes a synchronizing signal transmission cycle of the remote station 14 with respect to the master station 11. These cycles ta, tb and tc are asynchronous with each other, but the cycle time thereof are substantially identical to each other. Symbols $a_0$, $a_1$ and $a_2$ denote intermittent receiving timing of the remote station 12 in the case of considering no random number values. Symbols $b_0$, $b_1$ and $b_2$ denote intermittent receiving timing of the remote station 13 in the case of considering no random number values. Symbols $c_0$, $c_1$ and $C_2$ denote intermittent receiving timing of the remote station 14 in the case of considering no random number values. Symbol A represents synchronizing signal transmission timing of the remote station 12 with respect to the master station 11. Symbol B represents synchronizing signal transmission timing of the remote station 13 with respect to the master station 11, and symbol C represents synchronizing signal transmission timing of the remote station 14 with respect to the master station 11.

Figure 3:
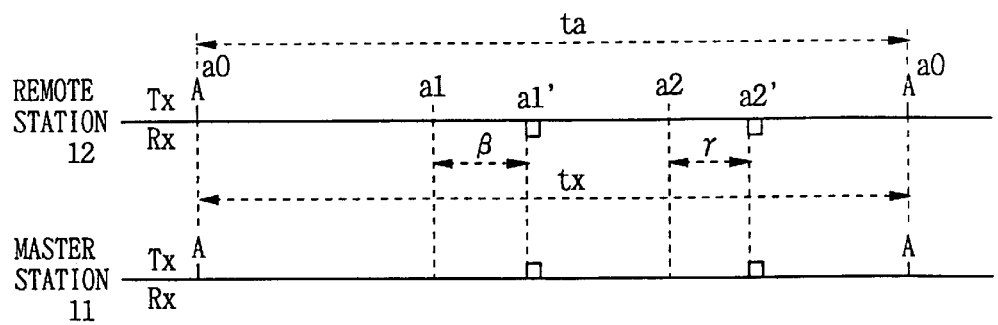
FIG. 3 is a timing chart showing transmission/receiving timing between a master station 11 and a remote station 12 in the case of considering random number values in the telemeter telecontrol system shown in FIG. 1.

FIG. 3 is a timing chart showing transmission/receiving timing between the master station 11 and the remote station 12 in the case of considering random number values. Similarly to the case of FIG. 2, symbols $a_0$, $a_1$ and $a_2$ denote intermittent receiving timing of the remote station 12 in the case of considering no random number values. Symbol β denotes a random number value, corresponding to the timing $a_1$, which is shared by the remote station 12 and the master station 11. Symbol γ denotes a random number value, corresponding to the timing $a_2$, which is shared by the remote station 12 and the master station 11. Symbol $a_1'$ denotes intermittent receiving timing of the remote station 12, which is shifted from the timing $a_1$ by the corresponding random number value β. As also illustrated in FIG. 3, the symbol $a_2'$ denotes intermittent receiving timing of the remote station 12, which is shifted from the timing $a_2$ by the corresponding random number value γ. The intermittent receiving timing $a_1'$ and $a_2'$ are used for re-transmission of data.

With reference to FIGS. 2 and 3, operations of the telemeter telecontrol system shown in FIG. 1 are now described.

First, operations related to the synchronizing signal which is cyclically transmitted from the remote station 12 to the master station 11 are described. The remote station 12 transmits the synchronizing signal to the master station 11 in the cycle ta (timing A) obtained by integer-multiplying a cycle t. When the synchronizing signal is received from the remote station 12, the master station 11 transmits an acknowledgement signal to the remote station 12. At the same time, the control unit 112 of the master station 11 detects the intermittent receiving timing ($a_0$, $a_1$ and $a_2$) of the remote station 12 on the basis of the synchronizing signal which is transmitted every constant period, and stores the detected intermittent receiving timing data in the memory device 111. When no acknowledgement signal for the synchronizing signal is transmitted from the master station 11, the remote station 12 performs predetermined re-transmission.

Operations which are similar to the above are performed also between the remote station 13 and the master station 11 as well as between the remote station 14 and the master station 11.

Operations for transmitting data from the master station 11 to the remote station 12 are now described. In this case, the control unit 112 acquires the intermittent receiving timing data ($a_0$, $a_1$ and $a_2$) of the remote station 12 from the memory device 111. Then, the control unit 112 transmits data to the remote station 12 through the radio communication device 113 at timing $a_0$ which is read first from the memory device 111 as transmission timing.

In the remote station 12, the control unit 121 receives the data from the master station 11 through the radio communication device 122 at the timing $a_0$ as receiving timing. When the data from the master station 11 is normally received, the control unit 121 transmits a receiving completion signal to the master station 11 through the radio communication device 122.

When the receiving completion signal is received from the remote station 12, the master station 11 completes the data transmitting operation for the remote station 12. If the data of the timing $a_0$ is lost in the remote station 12 by collision or the like, on the other hand, no receiving completion signal is transmitted from the remote station 12 to the master station 11, and hence the master station 11 performs re-transmission.

When the master station 11 enters the re-transmission processing, the control unit 112 acquires the random number value β corresponding to the next transmission timing $a_1$ from the random number generator 114, and transmits the data to the remote station 12 through the radio communication device 113 at the timing $a_1'$ which is shifted from the timing $a_1$ by the random number value β as transmission timing.

In the remote station 12, on the other hand, the control unit 121 acquires the random number value β corresponding to the next receiving timing $a_1$ from the random number generator 123, and receives the data from the master station 11 through the radio communication device 122 at the timing $a_1'$ which is shifted from the timing $a_1$ by the random number value β as transmission timing. When the data from the master station 11 is normally received, the control unit 121 transmits a receiving completion signal to the master station 11 through the radio communication device 122.

When the receiving completion signal is received from the remote station 12, the master station 11 completes the data transmitting operation for the remote station 12. If the data of the timing $a_1'$ is lost in the remote station 12 by collision or the like, on the other hand, no receiving completion signal is transmitted from the remote station 12 to the master station 11, and hence the master station 11 performs re-transmission.

When the master station 11 enters the re-transmission processing, the control unit 112 acquires the random number value γ corresponding to the next transmission timing $a_2$ from the random number generator 114, and transmits the data to the remote station 12 through the radio communication device 113 at the timing $a_2'$ which is shifted from the timing $a_2$ by the random number value γ as transmission timing.

In the remote station 12, on the other hand, the control unit 121 acquires the random number value γ corresponding to the next receiving timing $a_2$ from the random number generator 123, and receives the data from the master station 11 through the radio communication device 122 at the timing $a_2'$ which is shifted from the timing $a_2$ by the random number value γ as receiving timing. When the data from the master station 11 is normally received, the control unit 121 transmits a receiving completion signal to the master station 11 through the radio communication device 122.

Processing which is similar to the above is performed also when the master station 11 transmits data to the remote stations 13 and 14 respectively. However, the values of the generated random numbers β and γ are varied with the remote stations.

As herein above described, the transmission and receiving timing in the case of re-transmitting the data are shifted by the random number values, whereby the transmission/receiving timing is shifted between the remote stations, and the data collision probability between the remote stations can be reduced. Further, the generated random number series are reset by the synchronizing signals transmitted from the remote stations and generated in the same cycle as the synchronizing signals, whereby it is possible to readily correct shift of the random numbers which are generated from the random number generators of the transmission and receiving sides caused by collision etc.

The master station 11 is regularly in a continuous receiving state, and hence the timing for transmitting data from the remote stations 12, 13 and 14 to the master station 11 may not be particularly taken into consideration.

Figure 4:
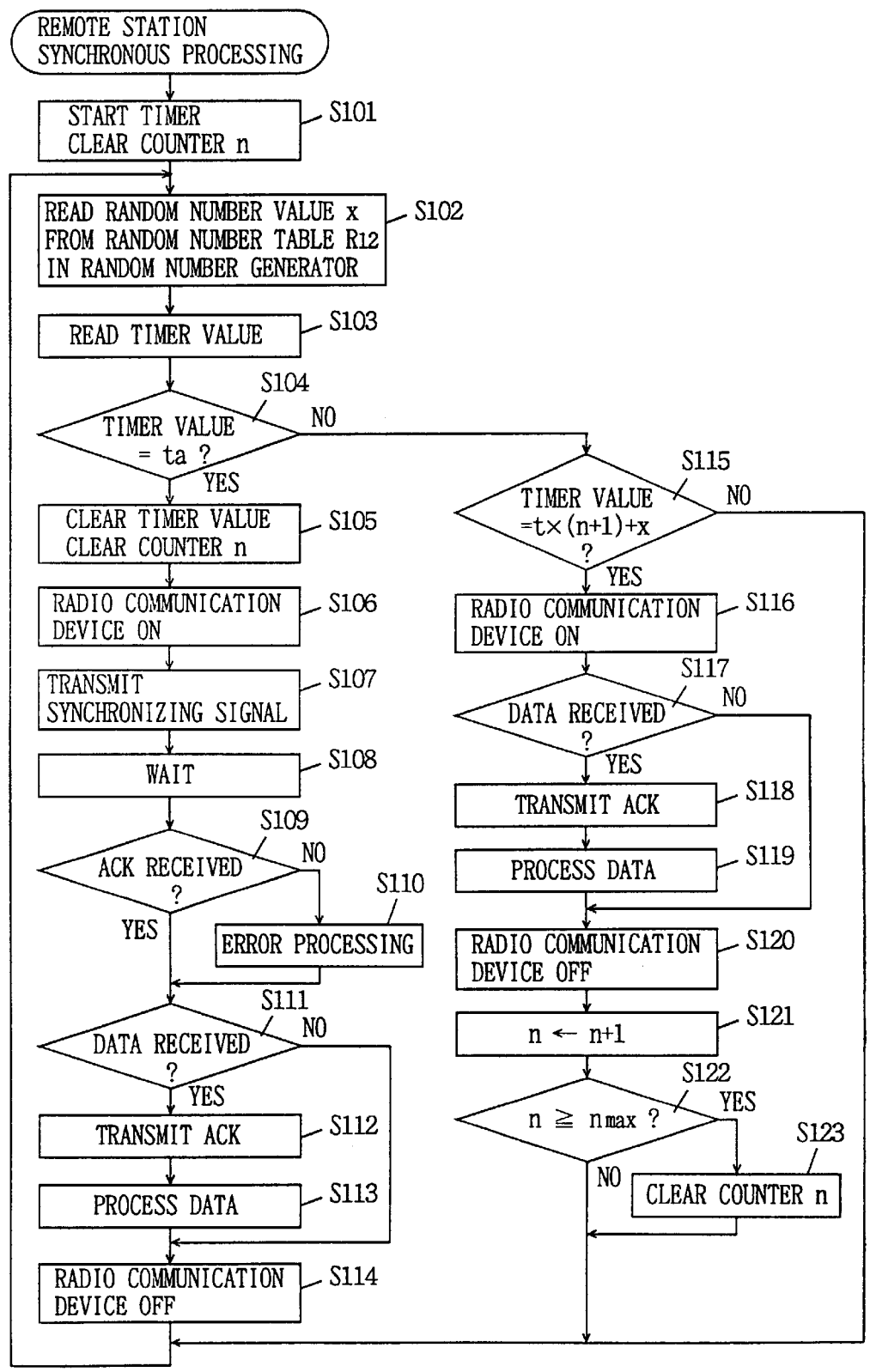
FIG. 4 is a flow chart showing operations of the remote station 12 shown in FIG. 1.
Figure 5:
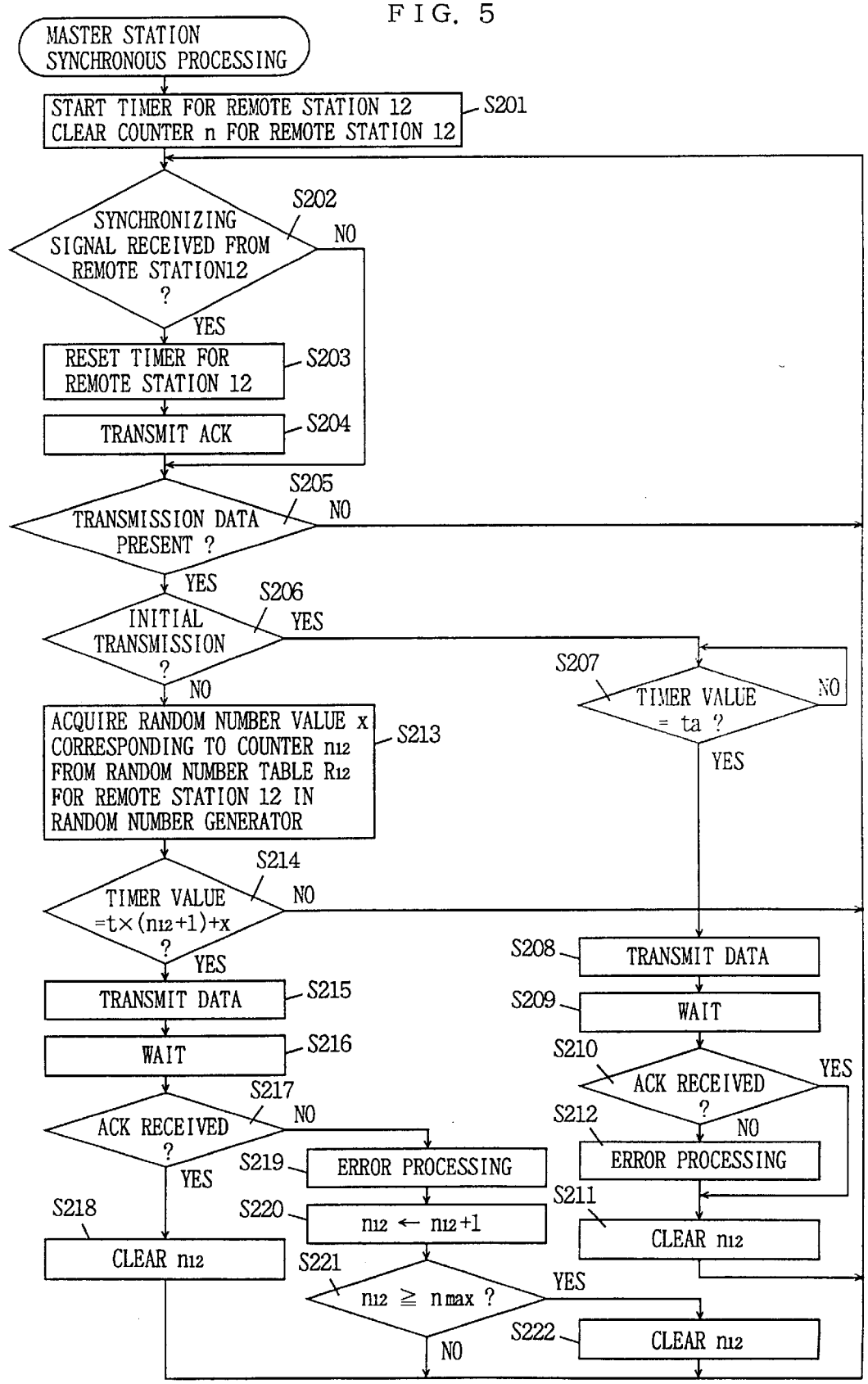
FIG. 5 is a flow chart showing operations of the master station 11 shown in FIG. 1.

FIG. 4 is a flow chart showing the operations of the remote station 12 shown in FIG. 1. On the other hand, FIG. 5 is a flow chart showing the operations of the master station 11 shown in FIG. 1. With reference to FIGS. 4 and 5, the operations of the telemeter telecontrol system shown in FIG. 1 are now described in further detail.

With reference to FIG. 4, the operations of the remote station 12 are now described. The control unit 121 starts an internal timer (not shown), and clears an internal counter n (not shown) (step S101). Then, the control unit 121 reads a random number value x corresponding to a count value "n" of the counter n, i.e., $R_{12}(n+1)$, from a random number table $R_{12}$ in the random number generator 123 (step S102). The initial count value "n" of the counter n is zero, and hence the random number which is read first is as follows:

$R_{12}(1)=\beta$

Then, the control unit 121 reads a timer value from the aforementioned timer (step S103), and determines whether or not this timer value coincides with ta i.e., whether or not the synchronizing transmission timing A shown in FIG. 2 arrives (step S104).

It is assumed that the timer value coincides with ta and the synchronizing signal transmission timing A arrives at the step S104. In this case, the control unit 121 transmits the synchronizing signal to the master station 11, and receives the data transmitted from the master station 11. The control unit 121 first clears the timer value, and clears the counter n (step S105). Then, the control unit 121 turns on the radio communication device 122 (step S106), and transmits the synchronizing signal to the master station 11 (step S107). Then, the control unit 121 waits for transmission of an acknowledgement signal from the master station 11 by a prescribed time (step S108). After a lapse of the prescribed time, the control unit 121 determines whether or not the acknowledgement signal is transmitted from the master station 11 (step S109), and shifts to receiving processing if transmitted, while performing error processing (step S110) if not transmitted, to thereafter shift to the receiving processing.

Then, the control unit 121 determines whether or not data is received from the master station 11 (step S111), transmits a receiving completion signal to the master station 11 if data is received (step S112), and thereafter performs prescribed processing on the received data (step S113). Thereafter the control unit 121 turns off the radio communication device 122 (step S114). If no data is received from the master station 11, on the other hand, the control unit 121 performs the processing at the step S114 without performing those of the steps S112 and S113. After the processing at the step S114 is completed, the control unit 121 returns to the operation of the step S102.

Description is now made of the case where the timer value ta is not coincident with ta at the step S104. In this case, the control unit 121 determines whether the timer value coincides with:

$$t\times(n+1)+x$$

i.e., whether the receiving timing $a_1'$ or $a_2'$ shown in FIG. 3 arrives (step S115). In the above equation, t represents the time span between the timing $a_0$ and $a_1$, and that between the timing $a_1$ and $a_2$ in FIG. 2. Assuming that the count value "n" of the counter n is zero and the random number value x is as follows:

$$x=R_{12}(1)=\beta$$

the receiving timing $a_1'$ arrives when the timer value reaches t+β. Assuming that the count value "n" of the counter n is 1 and the random number value x is as follows:

$$x=R_{12}(2)=\gamma$$

on the other hand, the receiving timing $a_2'$ arrives when the timer value reaches 2t+γ.

It is assumed that the timer value coincides with t×(n+1)+x (=t+β or 2t+γ) at the step S115 and the receiving timing $a_1'$ or $a_2'$ shown in FIG. 3 arrives. In this case, the control unit 121 turns on the radio communication device 122 (step S116), determines whether or not data is received from the master station 11 (step S117), transmits a receiving completion signal to the master station 11 (step S118) if data is received, and thereafter performs prescribed processing on the received data (step S119). Thereafter the control unit 121 turns off the radio communication device 122 (step S120). If no data is received from the master station 11, on the other hand, the control unit 121 performs the processing of the step S120 without performing those of the steps S118 and S119.

Then, the control unit 121 increments the count value "n" of the counter n by 1 (step S121). Then, the control unit 121 determines whether or not the count value "n" is in excess of a prescribed value $n_{max}$ (step S122). According to this embodiment, $n_{max}$=2. If the count value "n" is not in excess of $n_{max}$, i.e., in the case of (n=0 or 1), the control unit 121 returns to the operation of the step S102. If the count value "n" is in excess of $n_{max}$, i.e., if n=3, the control unit 121 clears the counter n (step S123), and thereafter returns to the operation of the step S102.

If the timer value is neither ta nor t×(n+1)+x, the control unit 121 returns to the operation of the step S102 without performing any operation.

While the operations of the remote station 12 have been described with reference to FIG. 4, operations similar to the above are performed also in the remaining remote stations 13 and 14.

With reference to FIG. 5, the operations of the master station 11 for the remote station 12 are now described. The control unit 112 of the master station 11 first starts a timer (not shown but provided in the interior of the control unit 112) for the remote station 12, and clears a counter $n_{12}$ (not shown but provided in the interior of the control unit 112) for the remote station 12 (step S201). Then, the control unit 112 determines whether or not a synchronizing signal is received from the remote station 12 (step S202). If the synchronizing signal is received, the control unit 112 resets the timer for the remote station 12 (step S203), and transmits an acknowledgement signal to the remote station 12 (step S204). Thereafter the control unit 112 determines whether or not data to be transmitted to the remote station 12 is present (step S205). If no synchronizing signal is transmitted from the remote station 12, the control unit 112 skips the operations of the steps S203 an S204, and performs the operation at the step S205.

If no data to be transmitted is present at the step S205, on the other hand, the control unit 112 returns to the operation of the step S202. If data to be transmitted is present, on the other hand, the control unit 112 determines whether or not initial transmission processing is performed as to the data (step S206). If the initial transmission processing is performed, the control unit 112 waits for the timer value of the timer for the remote station 12 reaching ta i.e., arrival of the receiving timing $a_0$ (see FIG. 2) of the remote station 12 (step S207), and transmits the data to the remote station 12 (step S208). Then, the control unit 112 waits for transmission of a receiving completion signal from the remote station 12 by a prescribed time (step S209). After a lapse of the prescribed time, the control unit 112 determines whether or not the receiving completion signal is transmitted from the remote station 12 (step S210), clears the counter $n_{12}$ for the remote station 12 if transmitted (step S211), and returns to the operation of the step S202. If no receiving completion signal is transmitted from the remote station 12, on the other hand, the control unit 112 performs error processing (step S212), thereafter clears the counter $n_{12}$ for the remote station 12 (step S211), and returns to the operation of the step S202.

As hereinabove described, the control unit 112 first transmits the data at the normal receiving timing $a_0$ of the remote station 12. If the remote station 12 cannot receive the data due to collision of the data or the like, however, the control unit 112 re-transmits the data at the receiving timing $a_1'$ shown in FIG. 3. If the data cannot be received at the receiving timing $a_1'$ either, the control unit 112 re-transmits the data again at the receiving timing $a_2'$ in FIG. 3. The operations in this case are now described.

When transmission data is present at the step S205 and a determination is made at the step S206 that the transmission processing is not the first one as to the transmission data, the control unit 112 reads a random number value x corresponding to the count value "$n_{12}$" of the counter $n_{12}$, i.e., $R_{12}$ ($n_{12}$+1), from the random number table $R_{12}$ in the random number generator 114 (step S213). The initial count value "$n_{12}$" of the counter $n_{12}$ is zero (cleared at the step S211), and hence the random number value x which is read first is as follows:

$$R_{12}(1)=\beta$$

Then, the control unit 112 reads the timer value from the timer for the remote station 12, and determines whether or not th is timer value coincides with:

$$t\times(n_{12}+1)+x$$

i.e., whether the receiving timing $a_1'$ or $a_2'$ shown in FIG. 3 arrives (step S214). Assuming that the count value "$n_{12}$" of the counter $n_{12}$ for the remote station 12 is zero and the random number value $x=R_{12}(1)=\beta$, the receiving timing $a_1'$ arrives when the timer value reaches $t+\beta$. Assuming that the count value "$n_{12}$" of the counter $n_{12}$ is 1 and the random number value $x=R_{12}(2)=\gamma$, on the other hand, the receiving timing $a_2'$ arrives when the timer value reaches $2t+\gamma$.

It is assumed that the timer value coincides with $t\times(n_{12}+1)+x(=t+\beta$ or $2t+\gamma)$ and the receiving timing $a_1'$ or $a_2'$ shown in FIG. 3 arrives at the step S214. In this case, the control unit 112 transmits data to the remote station 12 (step S215). Then, the control unit 112 waits for transmission of a receiving completion signal from the remote station 12 by a prescribed time (step S216). After a lapse of the prescribed time, the control unit 112 determines whether or not the receiving completion signal is transmitted from the remote station 12 (step S217), clears the counter $n_{12}$ for the remote station 12 if transmitted (step S218), and thereafter returns to the operation of the step S202. If no receiving completion signal is transmitted from the remote station 12, on the other hand, the control unit 112 performs error processing (step S219), and thereafter increments the count value "$n_{12}$" of the counter $n_{12}$ for the remote station 12 by 1 (step S220). Thereafter the control unit 112 determines whether or not the counter value "$n_{12}$" is in excess the prescribed value $n_{max}$ (step S221). According to this embodiment, $n_{max}=2$. If the count value "$n_{12}$" is not in excess of $n_{max}$, i.e., in the case of ($n_{12}=0$ or 1), the control unit 112 returns to the operation of the step S202. If the count value "$n_{12}$" is in excess of $n_{max}$, i.e., if n=3, on the other hand, the control unit 112 clears the count value of the counter $n_{12}$ (step S222), and thereafter returns to the operation of the step S202.

If the timer value is not $t\times(n_{12}+1)+X$, the control unit 112 returns to the operation of the step S202 without performing any operation.

While the operations of the master station 11 for the remote station 12 have been described with reference to FIG. 5, those of the master station 11 for the remaining remote stations 13 and 14 are similar to the above.

Figure 6:
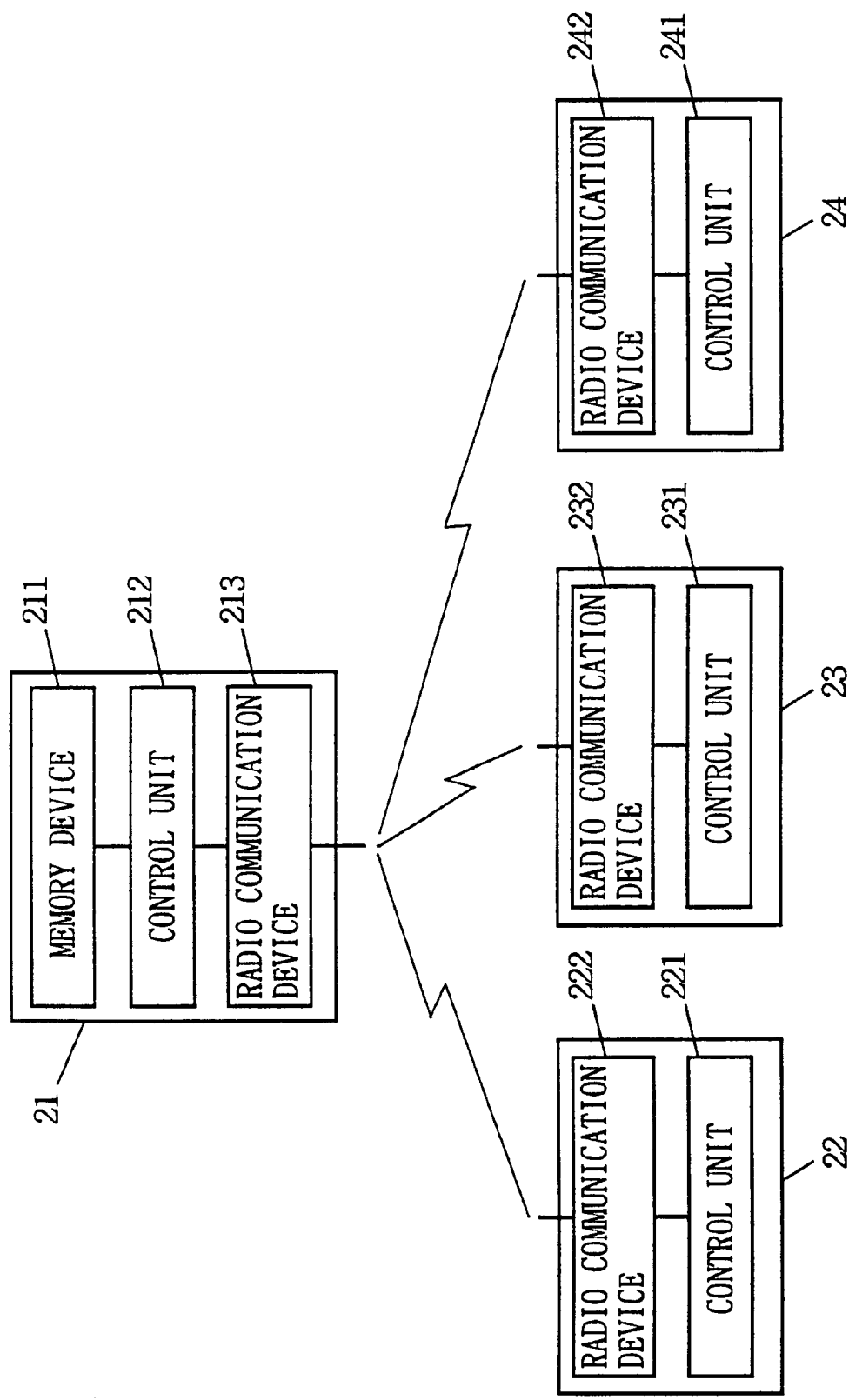
FIG. 6 is a block diagram showing the structure of a telemeter telecontrol system according to a second embodiment of the present invention.

FIG. 6 is a block diagram showing the structure of a telemeter telecontrol system according to a second embodiment of the present invention. Referring to FIG. 6, this telemeter telecontrol system comprises a master station 21 performing continuous receiving, and remote stations 22 to 24 each performing intermittent receiving in a cycle t. The master station 21 includes a memory device 211 for storing transmission timing of synchronizing signals transmitted from a plurality of remote stations, a control unit 212 for controlling transmission timing for the respective remote stations, and a radio communication device 213. The remote station 22 includes a control unit 221 and a radio communication device 222. Similarly, the remote station 23 includes a control unit 231 and a radio communication device 232, and the remote station 24 include s a control unit 241 and a radio communication device 242.

Figure 7:
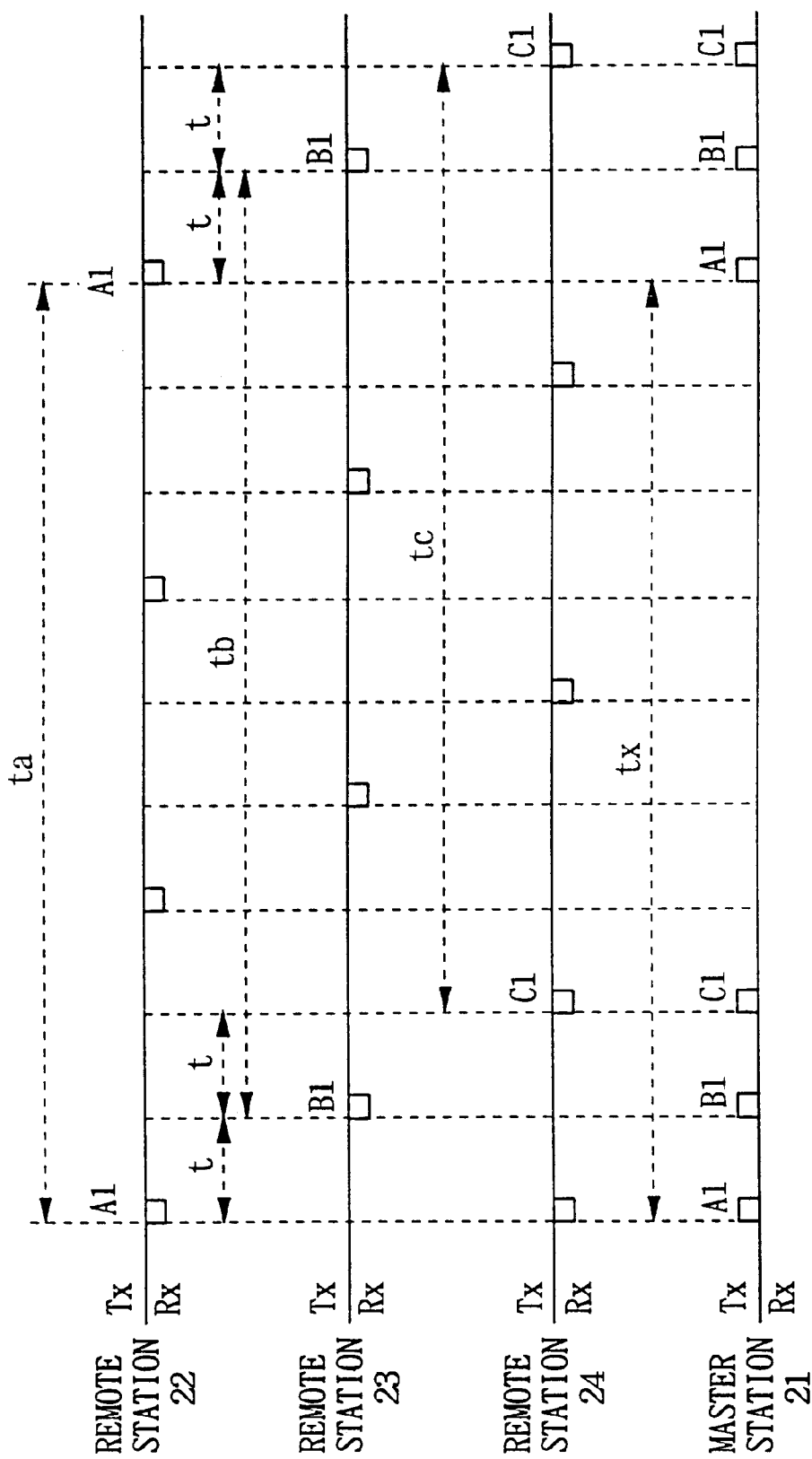
FIG. 7 is a timing chart showing transmission/receiving timing of the telemeter telecontrol system shown in FIG. 6.

FIG. 7 is a timing chart showing transmission/receiving timing of the telemeter telecontrol system shown in FIG. 6. Referring to FIG. 7, symbol A1 denotes intermittent receiving timing of the remote station 22 and transmission timing of the master station 21 for the remote station 22. Symbol B1 denotes intermittent receiving timing of the remote station 23 and transmission timing of the master station 21 for the remote station 23. Symbol C1 denotes intermittent receiving timing of the remote station 24 and transmission timing of the master station 21 for the remote station 24. The transmission cycles t for the respective remote stations are synchronous with each other, and the cycle time thereof are identical to each other.

With reference to FIG. 7, the operations of the telemeter telecontrol system shown in FIG. 6 are now described.

In the master station 21, the control unit 212 divides a transmission slot of a cycle tx into a plurality of slots, and allocates the timing A1, B1and C1 to the remote stations 22, 23 and 24 as transmission timing slots, respectively. This transmission timing information is stored in the memory device 211.

The master station 21 transmits a synchronizing signal to the remote station 22 in the cycle t (timing A1). When the synchronizing signal transmitted from the master station 21 is received in the remote station 22 through the radio communication device 222, the control unit 221 transmits an acknowledgement signal to the master station 21 through the radio communication device 222. In order to transmit the synchronizing signal from the master station 21 to the remote station 22, the control unit 212 acquires the transmission timing information for the remote station 22 from the memory device 211, and transmits the signal to the remote station 22 at the transmission timing (timing A1) through the radio communication device 213.

Then, the master station 21 transmits a synchronizing signal to the remote station 23 in the cycle t (timing B1). When the synchronizing signal transmitted from the master station 21 is received in the remote station 23 through the radio communication device 232, the control unit 231 transmits an acknowledgement signal to the master station 21 through the radio communication device 232. In order to transmit the synchronizing signal from the master station 21 to the remote station 23, the control unit 212 acquires the transmission timing information for the remote station 23 from the memory device 211, and transmits the signal to the remote station 23 at the transmission timing (timing B1) through the radio communication device 213.

Then, the master station 21 transmits a synchronizing signal to the remote station 24 in the cycle t (timing C1). When the synchronizing signal transmitted from the master station 21 is received in the remote station 24 through the radio communication device 242, the control unit 241 transmits an acknowledgement signal to the master station 21 through the radio communication device 242. In order to transmit the synchronizing signal from the master station 21 to the remote station 24, the control unit 212 acquires the transmission timing information for the remote station 24 from the memory device 211, and transmits the signal to the remote station 24 at the transmission timing (timing C1) through the radio communication device 214.

As to transmission/receiving of data, processing which is similar to that of the first embodiment is performed.

According to the second embodiment, as hereinabove described, the master station 21 controls the transmission timing of the synchronizing signals for the remote stations 22 to 24 respectively in an allocated manner, whereby the intermediate transmission/receiving timing of the remote stations which are generated from the transmission timing of the synchronizing signals are shifted from each other between the remote stations, and the timing for transmitting/receiving data between the master station and the remote stations are also shifted from each other. Thus, collision of data between the remote stations can be prevented.

Figure 8:
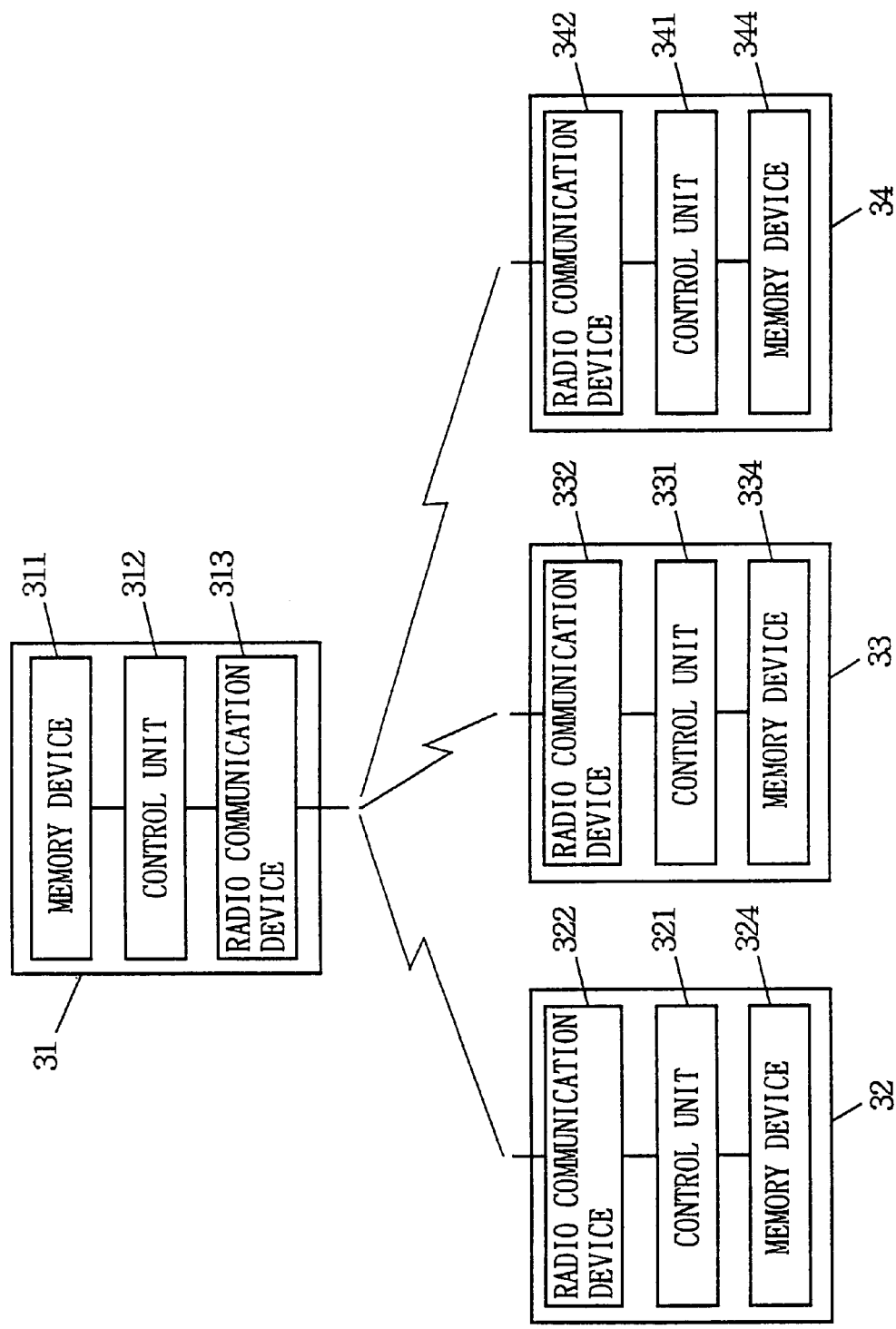
FIG. 8 is a block diagram showing the structure of a telemeter telecontrol system according to a third embodiment of the present invention.

FIG. 8 is a block diagram showing the structure of a telemeter telecontrol system according to a third embodiment of the present invention. Referring to FIG. 8, this telemeter telecontrol system comprises a master station 31 performing continuous receiving in a cycle t, and remote stations 32 to 34 each performing intermittent receiving in the cycle t. The master station 31 includes a memory device 311 for storing transmission timing of synchronizing signals transmitted from a plurality of remote stations, a control unit 312 for controlling transmission timing for the respective remote stations, and a radio communication device 313. The remote station 32 includes a control unit 321, a radio communication device 322, and a memory device 324. Similarly, the remote station 33 includes a control unit 331, a radio communication device 332, and a memory device 334, and the remote station 34 includes a control unit 341, a radio communication device 342 and a memory device 344.

Figure 9:
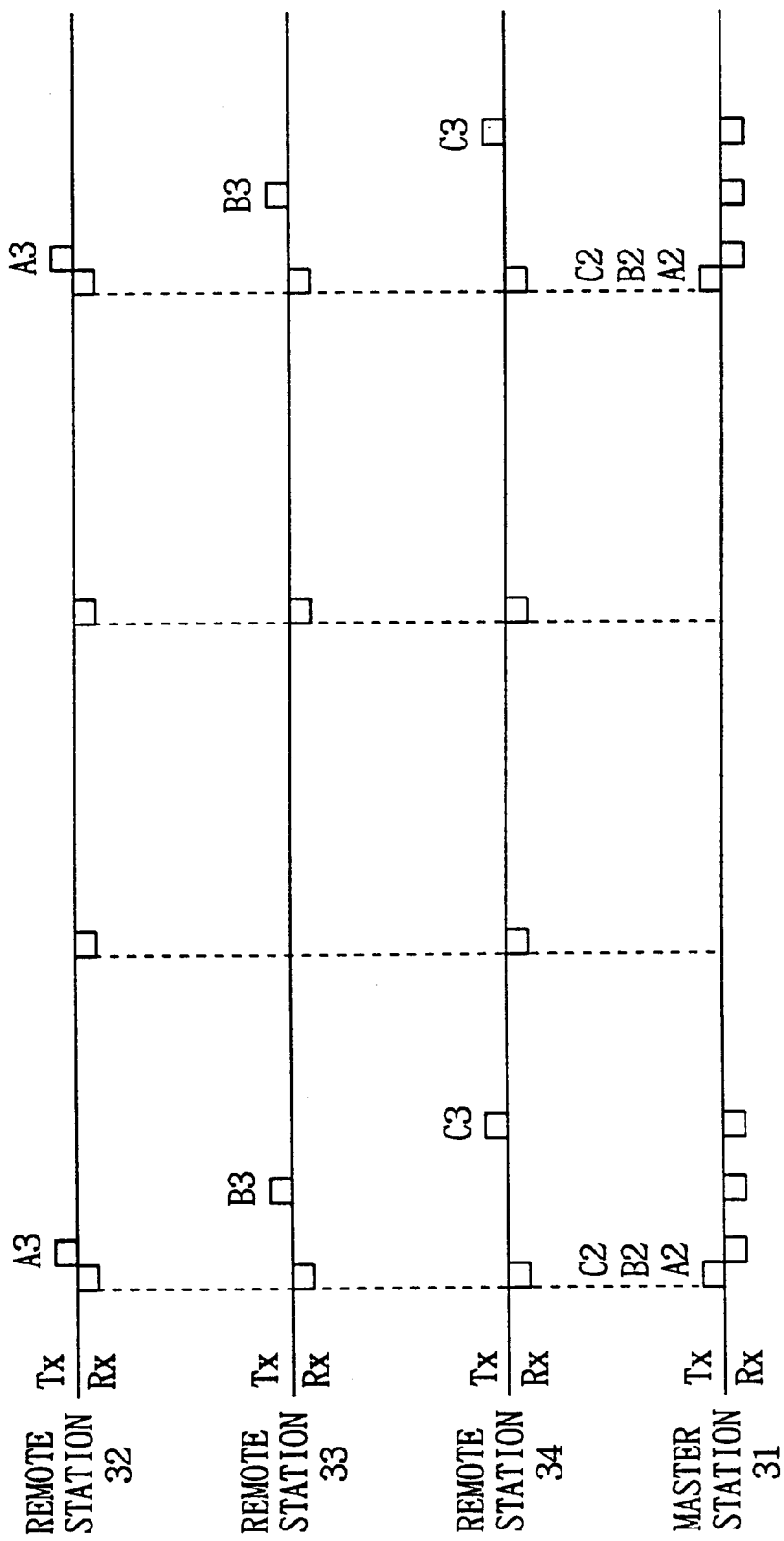
FIG. 9 is a timing chart showing synchronizing signal timing of the telemeter telecontrol system shown in FIG. 8.
Figure 10:
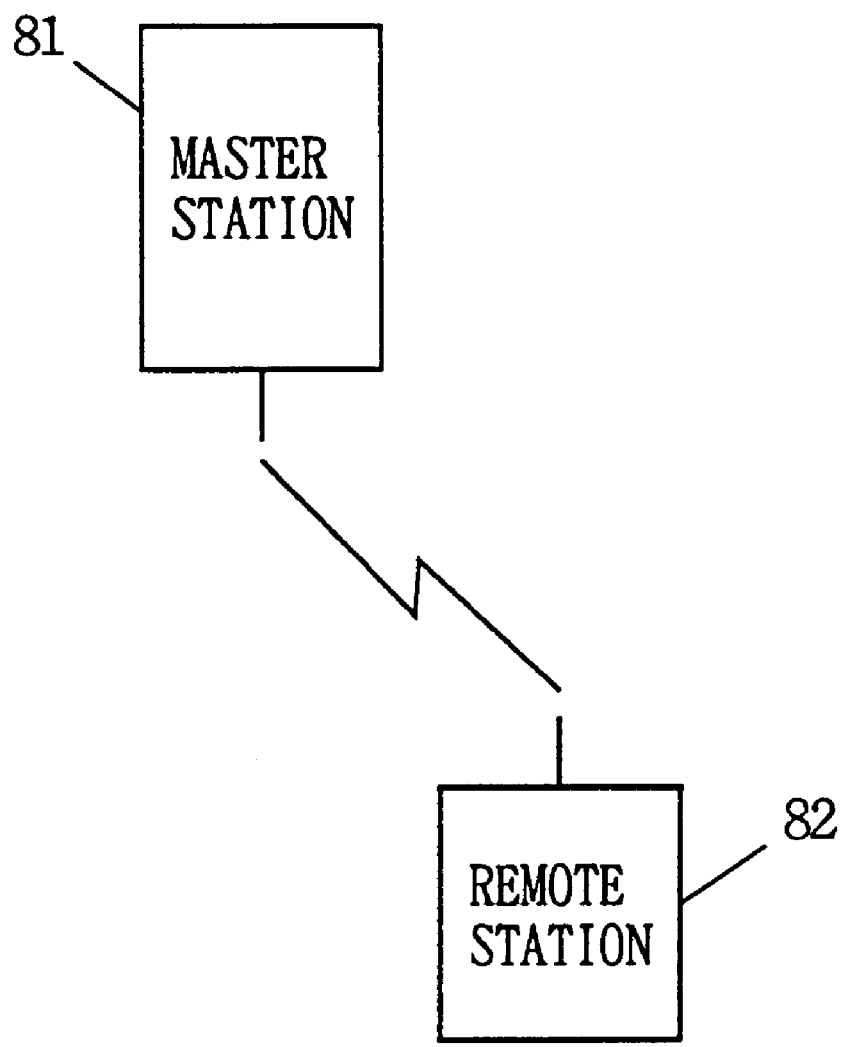
FIG. 10 is a schematic block diagram showing the structure of a conventional telemeter telecontrol system.

FIG. 9 is a timing chart showing synchronizing signal timing of the telemeter telecontrol system shown in FIG. 8. Referring to FIG. 9, symbols A2, B2 and C2 denote transmission timing of synchronizing signals from the master station 31 to the remote stations 32, 33 and 34, respectively. Symbol A3 denotes transmission timing for an acknowledgement signal from the remote station 32 to the synchronizing signal of the master station 31. Symbol B3 denotes transmission timing for an acknowledgement signal from the remote station 33 to the synchronizing signal of the master station 31. Symbol C3 denotes transmission timing for an acknowledgement signal from the remote station 34 to the synchronizing signal of the master station 31.

With reference to FIG. 9, the operations of the telemeter telecontrol system shown in FIG. 8 are now described.

According to this embodiment, a plurality of transmission timing for acknowledgement to the synchronizing signals are provided for all remote stations in a single system, and the transmission timing A3, B3 and C3 are allocated to the remote stations 32, 33 and 34, respectively. In the master station 31, the control unit 312 stores these timing in the memory device 311 as intermittent receiving timing data.

In order to transmit the synchronizing signals, the control unit 312 of the master station 31 acquires the intermittent receiving timing data of the remote stations from the memory device 311, and simultaneously transmits the synchronizing signals to all remote stations provided in the system at the transmission timing (A2, B2 and C2) through the radio communication device 313. When the synchronizing signal transmitted from the master station 31 is received in the remote station 32, the control unit 321 acquires transmission timing information on an acknowledgement signal for the master station 31 from the memory device 324, and transmits the acknowledgement signal at the transmission timing (timing A3) through the radio communication device 322. When the synchronizing signal transmitted from the master station 31 is received in the remote station 33, the control unit 331 similarly acquires transmission timing information on an acknowledgement signal for the master station 31 from the memory device 334, and transmits the acknowledgement signal at the transmission timing (timing B3) through the radio communication device 332. When the synchronizing signal transmitted from the master station 31 is received in the remote station 34, further, the control unit 341 acquires transmission timing information on an acknowledgement signal for the master station 31 from the memory device 344, and transmits the acknowledgement signal at the transmission timing (timing C3) through the radio communication device 342.

The master station 31 monitors the acknowledgement signals from all remote stations through the control unit 312. If no acknowledgement signal from the remote station 32 can be received at the timing A3, the master station 31 determines that synchronous processing from the remote station 32 is abnormal, and performs predetermined re-transmission processing. If no acknowledgement signal from the remote station 33 can be received at the timing B3, the control unit 312 similarly determines that synchronous processing from the remote station 33 is abnormal, and performs predetermined re-transmission processing. If no acknowledgement signal from the remote station 34 can be received at the timing C3, further, the control unit 312 determines that synchronous processing from the remote station 34 is abnormal, and performs predetermined re-transmission processing.

As to transmission/receiving of data, processing which is similar to that of the first embodiment is performed.

According to the third embodiment, as hereinabove described, the master station simultaneously transmits synchronizing signals to all remote stations, while acknowledgement signals are transmitted from the remote stations at shifted timing.

In the second or third embodiment, the remote stations or master station perform(s) intermittent transmission/receiving, and hence the communication may be disabled or re-transmission processing may be required by the number of times data are lost by collision on the radio circuit. Similarly to the first embodiment, therefore, the same random number generators may be added to the master station and the remote stations so that the transmission side generates a random number time α in the random number generator in data re-transmission for shifting re-transmitted data transmission timing by α, while the receiving sides generate random number time α in the random number generators in re-transmitted data receiving for shifting the re-transmitted data receiving timing by α. Thus, the frequency of data collision can be reduced so that reliable intermittent transmission/receiving operations can be performed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A telemeter telecontrol system comprising a plurality of remote stations, and a single master station operable to collect measured values from said plurality of remote stations and to remotely control operations of said plurality of remote stations, wherein each said remote station is operable to perform intermittent transmission/receiving operations in a constant cycle, and comprises:
  a remote station side communication device, and
  a remote station side control unit operable to control said remote station side communication device to transmit a synchronizing signal to said master station in said constant cycle, and
said master station comprises:
  a master station side communication device,
  a memory device storing intermittent receiving timing information of each said remote station, and
  a master station side control unit operable to control said master station side communication device to acquire information on intermittent receiving timing corresponding to each said remote station, respectively, from said memory device upon receiving the synchronization signal from each said remote station, respectively, and to perform a transmitting operation for said each remote station, respectively in coincidence with the corresponding intermittent receiving timing acquired by said master station side communication device.

2. The telemeter telecontrol system in accordance with claim 1, wherein
  said master station further comprises a master station side random number generator operable to generate a plurality of random number series corresponding to said remote stations, respectively,
  each said remote station further comprises a remote station side random number generator operable to generate the same random number series as the corresponding random number series of said master station side random number generator, said random number series being different from those of the other remote stations,
  said master station side control unit of said master station is operable to control said master station side communication device to read a random number value a corresponding to prescribed time t1 from said master station side random number generator in transmission of data at time t1 and to shift data transmission timing from the prescribed time t1 by time corresponding to the random number value a, and
  said remote station side control unit of each said remote station is operable to control said remote station side communication device to read the random number a corresponding to the prescribed time t1 from said remote station side random number generator in receiving the data at the time t1 and to shift data receiving timing from the prescribed time t1 by the time corresponding to the random number value a.

3. The telemeter telecontrol system in accordance with claim 2, wherein
  said remote station side and master station side random number generators reset random number generation by the cycle of said synchronizing signal.

4. A telemeter telecontrol system comprising a plurality of remote stations, and a single master station operable to collect measured values from said plurality of remote stations and to remotely control operations of said plurality of remote stations, wherein
  said master station comprises:
    a master station side communication device,
    a memory device storing intermittent receiving timing information of each said remote station, and
    a master station side control unit operable to control said master station side communication device to transmit a synchronizing signal to each said remote station in a constant cycle and to acquire information of intermittent receiving timing corresponding to each said remote station, respectively, from said memory device in transmission of data to each said remote station, respectively, and to perform a transmitting operation for said each remote station, respectively, in coincidence with the corresponding intermittent receiving timing acquired by said master station side communication device, and
  each said remote station is operable to perform intermittent transmission/receiving operations in a constant cycle and comprises:
    a remote station side communication device, and
    a remote station side control unit operable to control said remote station side communication device to perform an intermittent receiving operation in synchronization with the synchronizing signal being transmitted from said master station.

5. The telemeter telecontrol system in accordance with claim 4, wherein
  said master station further comprises a master station side random number generator operable to generate a plurality of random number series corresponding to said remote stations, respectively
  each said remote station fuither comprises a remote station side random number generator operable to generate the same random number series as the corresponding random number series of said master station side random number generator, said random number series being different from those of the other remote stations,
  said master station side control unit of said master station is operable to control said master station side communication device to read a random number value a corresponding to a prescribed time t1 from said master station side random number generator in transmission of data at said time t1 and to shift data transmission timing from the prescribed time t1 by time corresponding to random number value a, and
  said remote station side control unit of each said remote station is operable to control said remote station side communication device to read the random number a corresponding to the prescribed time t1 from said remote station side random number generator in receiving the data at the time t1 and to shift a data receiving timing from the prescribed time t1 by the time corresponding to the random number value a.

6. A telemeter telecontrol system comprising a plurality of remote stations, and a single master station operable to collect measured values from said plurality of remote stations and to remotely control operations of said plurality of remote stations, wherein
  said master station comprises:
    a master station side communication device,
    a memory device storing intermittent receiving timing information of each said remote station, and
    a master station side control unit operable to control said master station side communication device to simultaneously transmit synchronizing signals to all said remote stations in a constant cycle and to acquire information of intermittent receiving timing corresponding to each said remote station, respectively, from said memory device in transmission of data to said each remote station and to perform transmitting operations for said each remote station, respectively, in coincidence with the corresponding intermittent receiving timing acquired by said master station side communication device, and
  each said remote station is operable to perform intermittent transmission/receiving operations in a constant cycle and comprises:
    a remote station side communication device, and
    a remote station side control unit operable to control said remote station side communication device to perform an intermittent receiving operation in synchronization with the synchronizing signal being transmitted from said master station.

7. The telemeter telecontrol system in accordance with claim 6, wherein
  said master station further comprises a master station side random number generator operable to generate a plurality of random number series corresponding to said remote stations, respectively,
  each said remote station further comprises a remote station side random number generator operable to generate the same random number series as the corresponding random number series of said master station side random number generator, the random number series being different from those of the other remote stations, said master station side control unit of said master station is operable to control said master station side communication device to reading a random number value a corresponding to prescribed time t1 from said master station side random number generator in transmission of data at the time t1 and to shift data transmission timing from the prescribed time t1 by time corresponding to the random number value a, and said remote station side control unit of said remote station is operable to control said remote station side communication device to reading the random number a corresponding to the prescribed time t1 from said remote station side random number generator in receiving the data at the time t1 and to shift data receiving timing from the prescribed time t1 by the time corresponding to the random number value a.

8. The telemeter telecontrol system in accordance with claim 7, wherein respective said remote stations transmit acknowledgement signals for the synchronization signals from said master station in prescribed order.

9. The telemeter telecontrol system in accordance with claim 7, wherein said master station side and remote station side random number generators reset random number generation by the cycle of said synchronizing signals.

\* \* \* \* \*